April 25, 1961 R. H. JONES 2,981,467
PROGRAM SELECTING APPARATUS FOR AN AUTOMATIC MACHINE
Filed March 15, 1957 5 Sheets-Sheet 1

INVENTOR.
RICHARD H. JONES
BY
AGENT

April 25, 1961  R. H. JONES  2,981,467
PROGRAM SELECTING APPARATUS FOR AN AUTOMATIC MACHINE
Filed March 15, 1957  5 Sheets-Sheet 2
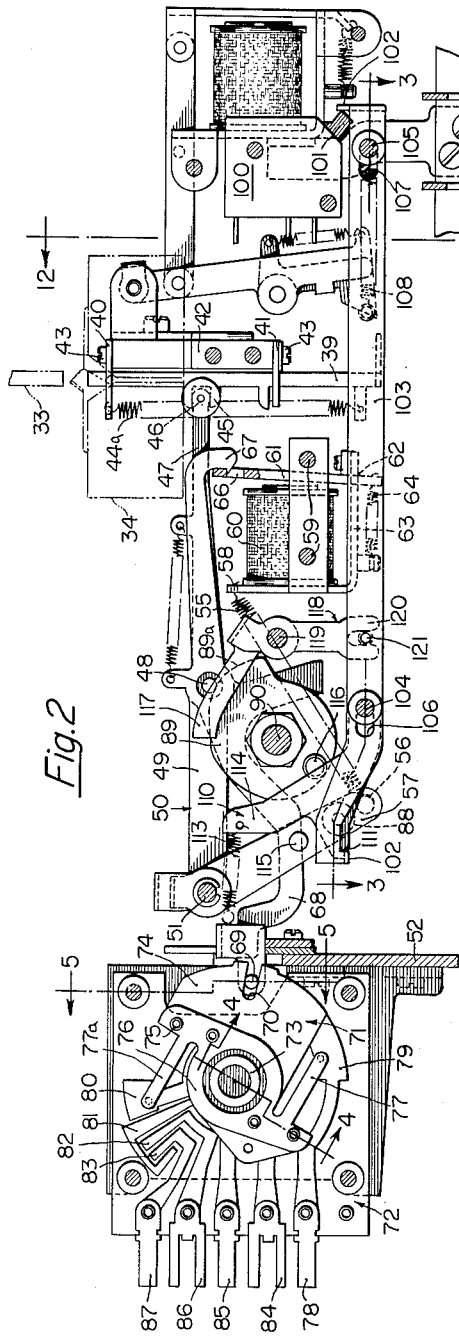
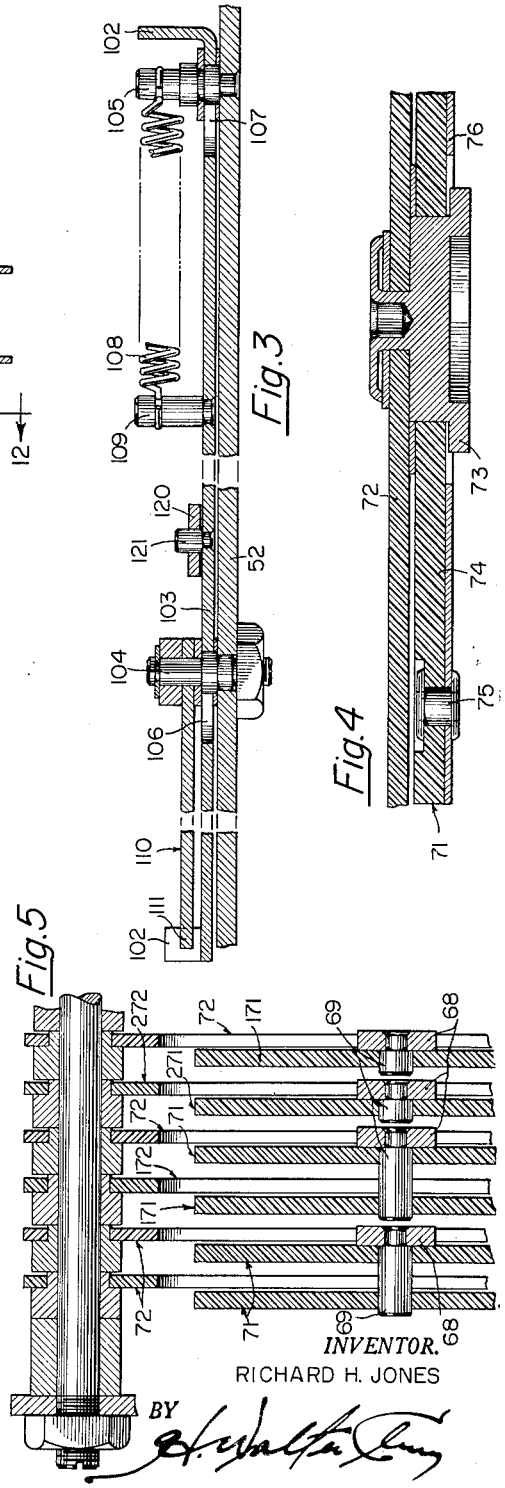
INVENTOR.
RICHARD H. JONES
BY
AGENT April 25, 1961 R. H. JONES 2,981,467
PROGRAM SELECTING APPARATUS FOR AN AUTOMATIC MACHINE
Filed March 15, 1957 5 Sheets-Sheet 3

*INVENTOR.*
RICHARD H. JONES
BY
AGENT

April 25, 1961  R. H. JONES  2,981,467
PROGRAM SELECTING APPARATUS FOR AN AUTOMATIC MACHINE
Filed March 15, 1957  5 Sheets-Sheet 4

INVENTOR.
RICHARD H. JONES
BY
AGENT

United States Patent Office 2,981,467
Patented Apr. 25, 1961

2,981,467

PROGRAM SELECTING APPARATUS FOR AN AUTOMATIC MACHINE

Richard H. Jones, Bridgeport, Pa., assignor to Burroughs Corporation, Detroit, Mich., a corporation of Michigan Filed Mar. 15, 1957, Ser. No. 646,414

5 Claims. (Cl. 235—60.47)

The invention hereinafter described and claimed has to do with automatic machines, and while useful in a wide variety of such machines it relates more particularly to machines of the type adapted to do accounting work. With still more particularity the invention has to do with apparatus for automatically controlling operating functions of such machines.

There are presently available accounting machines which, through internal programming apparatus, are adapted automatically to perform a multiplicity of different operations in accordance with pre-selected programs. One machine of this type is set forth in Patent 2,629,549, issued to T. M. Butler, February 24, 1953, for an "Automatic Function Control Mechanism for Accounting Machines." Machines of this type incorporate a program tray detachably connected to the carriage and jointly movable therewith. A series of depending control pins of various lengths extend downwardly from the tray. Contained within the machine immediately below the tray and extending transversely thereto are a plurality of sensing tappets. As the machine performs its functions the carriage and tray, and therefore also the pins, move transversely across the machine stopping at positions in accordance with a preselected program. During each cycle of operation of the machine, one or more of the pins is placed in alignment with the above-mentioned sensing tappets. The tappets in turn are respectively connected to one of the ends of a plurality of control arms having floating fulcrums. The opposite ends of the respective control arms engage various levers of the machine. The amount of movement imparted to these levers determines the controls and various functions of the machine.

During each cycle of operation of the machine the control arms and the tappets connected thereto are raised by associated mechanism. However, the pins depending from the program tray are selectively placed in alignment with the tappets and determine the height to which the ends of the arms will be raised, thus to control the amount of movement of the opposite ends of the above-mentioned levers and in this manner control certain functions of the machine.

It may therefore be understood that by placing pins of selected lengths at predetermined positions within the program tray, a desired sequence of operations may be obtained automatically, since the function to be performed is determined by the amount of movement imparted to the levers and this movement is fixed by the length of the pins aligned with the sensing tappets at any given time. A more detailed description of this mode of function control is set forth in the above-identified patent to Butler beginning at column 155 and in connection with Figures 155 through 175.

Due to the increased complexity and diversity of business operations, it has been found that a machine of the above-described type may be imparted a greater degree of flexibility than can be obtained solely through the utilization of the program tray shown and described in the above-identified patent to Butler. As an example reference may be had to the pending application in the name of George A. Baird and Thomas A. Dowds, S.N. 604,191, filed September 15, 1956, and assigned to the assignee of the present invention. In this application, as shown in Figures 35 and 36, the function control program unit, as described in the specification beginning on page 31, has been provided with a plurality of electrical sensing lanes comprising a group of electrical switches positioned beneath an extension of the program tray and actuated by pins depending from the underside of the extension for the purpose of programming a remotely positioned tape recording apparatus.

Accordingly it is an object of the present invention to provide apparatus particularly useful in machines of the above-described character whereby their program flexibility may be still further enhanced.

More specifically it is an object of the invention to provide novel switching apparatus particularly suitable for programming electro-mechanical accounting machines.

Still more specifically it is an object of the invention to provide a novel electro-mechanical switching apparatus.

For a greater appreciation of these and other objects of the invention reference is made to the following description and the accompanying drawings, in which:

Figure 2 is a sectional view taken along line 2—2 of Figure 1;

Figure 3 is an enlarged sectional view taken along the line 3—3 of Figure 2;

Figure 4 is an enlarged sectional view taken along the line 4—4 of Figure 2;

Figure 5 is an enlarged sectional view taken along the line 5—5 of Figure 2;

While the present invention is adaptable for operation in machines other than accounting machines of the aforesaid Butler type, it is particularly well-adapted for use therewith, and therefore the following description is exemplary of such use.

Figure 1:
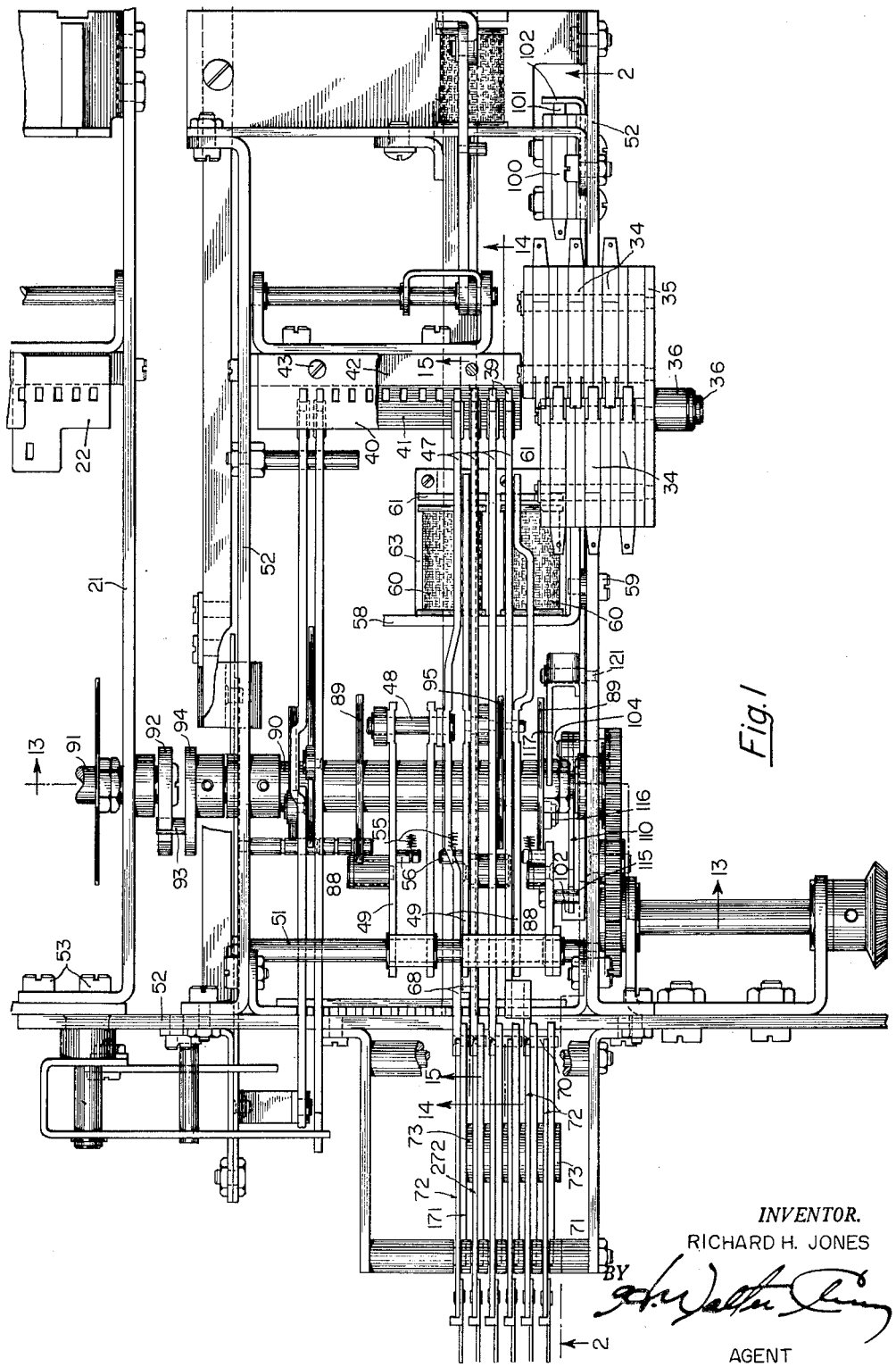
Figure 1 is a plan view of a fragmentary portion of an accounting machine including function control apparatus in accordance with the present invention.

Referring now to the drawings, and particularly to Figure 1, there is shown a fragmentary rear-portion of a business machine of the type shown and described in the aforesaid Butler patent, and which includes a framing member 21, upon which is supported certain of the machine components, such as the tappet guide plate 22, and the machine carriage (not shown) which moves transversely across the machine when the latter is in operation. The program tray 23, see Figure 12, is attached to the carriage for movement therewith.

Figure 12:
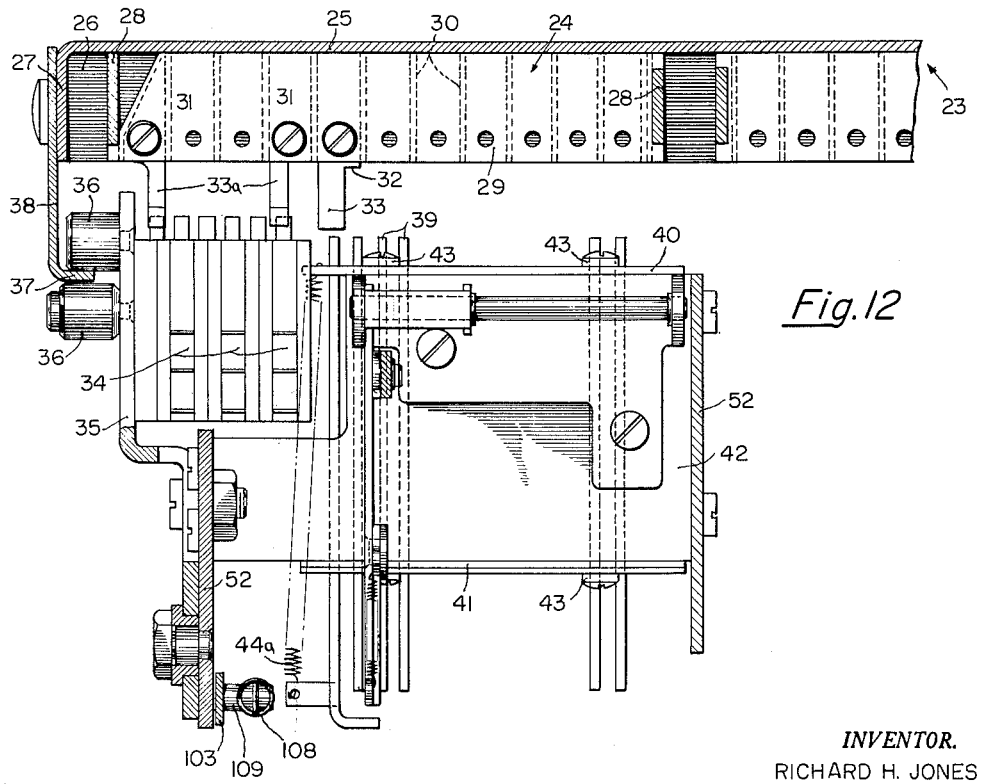
Figure 12 is an enlarged sectional view taken along the line 12—12 of Figure 2.

As shown in Figure 12, program tray 23, normally included in the Butler machine, has been modified by the addition of a rearward extension 24 which may comprise an individual unit attached to tray 23, but in the form shown in Figure 12 it is integral therewith. The tray comprises a sheet metal plate whose margins have been turned downwardly to form an inverted box-like container having a top 25, sides 26 and ends 27, only one of the sides 26 and ends 27 being shown. Positioned longitudinally across the extension of the tray and secured to sides 26 is a pair of elongated members 28, having opposed notches therein. Mounted between the notches and extending transversely across the tray between members 28 are a plurality of parallel plates 29 having vertical ribs 30 therein. Fixed to the plates, as by screws 31 and contained between the ribs is a plurality of abutments comprising lugs 32, each of which has integral therewith and depending therefrom a pin 33.

Certain of the pins identified by the numeral 33a are positioned to actuate switches 34 which may be used for controlling various functions of the machine, but are of no significance to the present invention, except that the bracket 35 to which they are mounted also carries a pair of rollers 36 between which the flange 37 of a rail 38 is slidably received for supporting the outer end of tray 24. All of these pins 33a are of the same length, but, as will be understood more clearly hereinafter, others of the pins may vary in height in accordance with a desired program. As the carriage is tabulated across the machine during performance of an accounting operation, various transversely aligned groups of the above-mentioned pins will be sequentially aligned above tappets 39.

Figure 14:
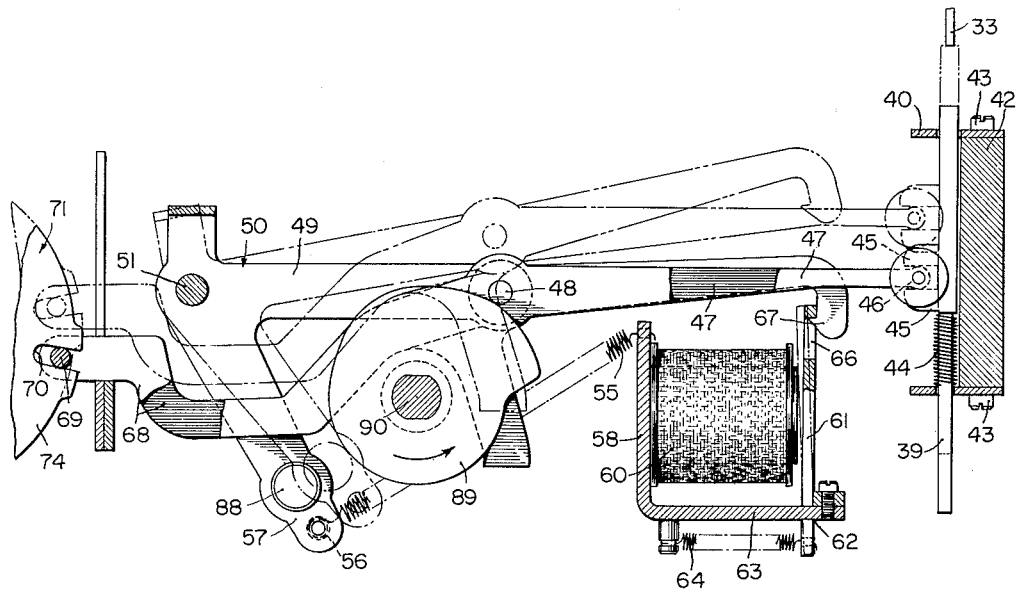
Figure 14 is an enlarged sectional view taken along the line 14—14 of Figure 1.

With reference to Figures 1, 2 and 14 it will be seen that tappets 39 are supported for vertical reciprocating movements by means of vertically spaced guide strips 40 and 41 secured respectively to the top and bottom edges of a plate 42 as by screws 43. Some of the tappets are urged in an upward direction as by a compression spring 44 (Figure 14) coiled around the tappet between the lower guide strip 41 and the lower of a pair of jaws 45 extending outwardly from each tappet, or, as shown in Figure 2, a tension spring 44a may be provided. Positioned between jaws 45 is one end 46 of a control arm 47 pivotally mounted at 48 to an intermediate portion of one arm 49 of a bell crank 50. The bell crank is pivotally mounted on a fixed shaft 51, the ends of which as seen in Figure 1, are journalled in framing member 52 which is attached to frame 20 as by screws 53. Still with reference to Figure 1, it will be noted that the ends of tappet support plate 42 are also secured to frame 52.

Returning to Figure 2 it is seen that arm 49 is biased in a counter clockwise direction by a coil spring 55 one end of which is secured to pin 56 at the lower end of arm 57 of bell crank 50. The other end of spring 55 is attached to the upper end of a bracket 58 secured by screws 59 (Figure 1) to frame 52. Also carried by bracket 58 is a pair of solenoids 60 each having a clapper 61 pivotally mounted at 62 on the horizontal portion 63 of the bracket and biased in a clockwise direction by a coil spring 64. The upper end 65 of each clapper 61 is provided with an aperture 66 adapted to engage hook 67 formed on a downwardly projecting portion of the outer end of bell crank arm 49, thus holding the bell crank in a retracted terminal position.

In particular accordance with the present invention and with reference to Figure 2, it will be noted that the opposite end 68 of each control arm 47, that is, that portion of the arm to the left of pivot 48, is provided with a pin 69 which is engaged in a slot 70 formed in the edge of a rotatably mounted wiper member 71 associated with a printed circuit panel 72.

It should be understood that the apparatus of the invention, as here described, has been set up to operate in conjunction with an accounting machine of the aforesaid Butler type which has been modified to afford multiplying operations. In this regard, it might be explained that wiper 71 and its associated printed circuit panel 72 comprise one of a plurality of multi-position function control switches effective for programming the multiplying operations in accordance with preselected programs. For this purpose a plurality of the switches has been provided, as more clearly seen in Figures 1, 5 and 12, thus enabling a multiplying program including a plurality of functions. The program may include, for example, all, or only part of the following functions: premultiplication; negative multiplication; round-off; clear; and decimal shift. Of course a lesser or greater number of such switches may be used, as necessitated by a desired program, which may include other functions than those listed above.

Figure 6:
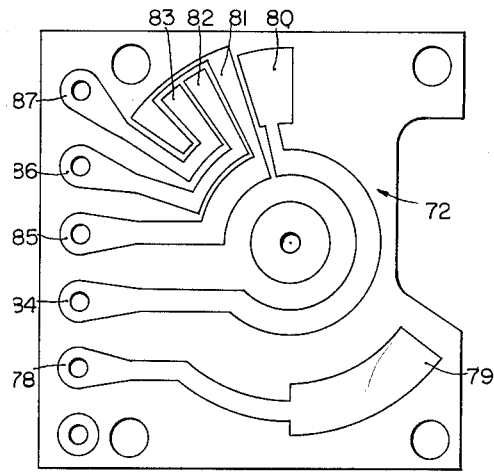
Figures 6, 7 and 8 are plan views of printed circuit panels forming a part of the illustrated embodiment of the invention.

As illustrated in Figures 2 and 4, wiper element 71 is rotatably mounted on panel 72 as at 73. The wiper comprises a wafer 74 of insulating material upon which is secured as by rivets 75, or any other suitable means, a conductive element 76 having an input wiper finger 77 and an output wiper finger 77a. Conductive element 76 preferably is of spring metal whereby the contact wiper fingers are biased against the panel 72 into firm contact therewith. In the form shown in Figure 2, input wiper 77 is electrically connected to an input terminal 78 throughout its total rotative movement by means of arcuately shaped printed wiring 79. Wiper 77a is arranged to move across a plurality of output printed wiring elements 80, 81, 82 and 83, see Figure 6, which are connected to output terminals 84, 85, 86 and 87 respectively (Figure 2).

In the operation of the apparatus as thus far described, and with reference to Figure 2, let it be assumed that the program tray 24 has been tabulated across the accounting machine to a position wherein a pin 33 is above tappet 39 representative of a desired program to be determined by the position of wiper element 77 upon printed wire 83, and hence output terminal 87. Now by pulsing solenoid 60 through associated apparatus (not shown) clapper 61 is rotated in a counter clockwise direction releasing hook 67 of bell crank 50 permitting the latter to be rotated in a counter clockwise direction as urged by spring 55. Such rotation will move pivot 48 in a counter clockwise direction about shaft 51 until cam follower wheel 88 on arm 57 contacts reset cam 89. During such movement control arm 47 is rotated in a counter clockwise direction with pin 69 at its left hand end as a pivot, and by reason of the engagement of the end 46 of arm 47 between jaws 45 the upper end of tappet 39 will move into contact with the lower end of pin 33. A slight shifting of pin 69 in slot 70 will occur during this movement, but not sufficient to disengage one from the other.

It will be understood that in some cases the end 46 of arm 47 when released moves more rapidly than pivot 48, thus causing a prior slight counter clockwise rotation of the arm about pivot 48 with a consequent slight movement of pin 69 in a counter clockwise direction. This latter movement rotates switch wiper 71 slightly in a clockwise direction, but not sufficient to move the contact fingers from their normal position on the printed circuit elements. In fact this slight movement advantageously is effective to maintain good electrical contact of the fingers with the circuit elements in the event the desired program does not require changing of that particular switch, that is, when no program pin is positioned above the tappet.

When a program pin is in place, however, the rotative movement of bell crank 50 continues beyond the time of contact of tappet 39 with pin 33 and the continuing movement of pin 48 about pivot 51 will now reverse the rotative direction of arm 47 to a clockwise direction with the pivot 46 of arm 47 as a pivot point. During this latter movement pin 69 moves upwardly to rotate wiper 71 in a counter clockwise direction to an extent sufficient to move finger 77a across contacts 80, 81 and 82 to come to rest on printed wiring 83. It will be understood, of course, that by changing pin 33 to one of shorter or longer length that the movement of wiper 71 may be varied, or if no pin is in position over the tappet there will be no movement of the wiper.

It will be understood also that the switch structure may be effective for a variety of functions or programming of the associated apparatus. For example, in the present embodiment the switch shown in Figure 2 (panel 72 and wiper 71) is adapted to accomplish the decimal shift operations of the multiplier. In the present embodiment this switch is doubled by the inclusion, as shown in Figure 1, of a pair of wipers 71 and a pair of printed circuit panels 72, both operable by a common pin 69, see Figure 5.

Figure 7:
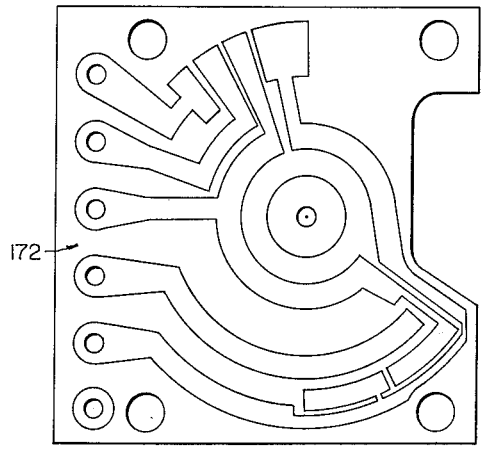
Figure 8:
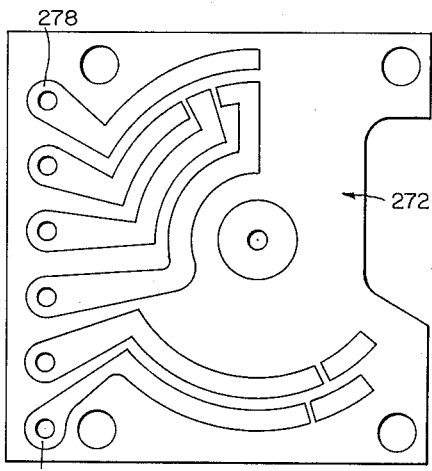
Figure 9:
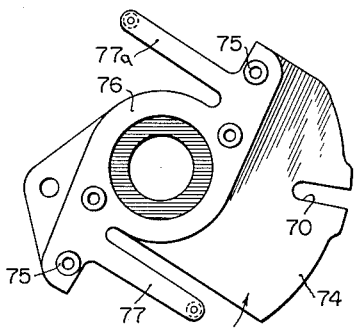
Figures 9, 10 and 11 are plan views of wiper contact elements associated with the printed circuit panels shown in Figures 6, 7 and 8.
Figure 10:
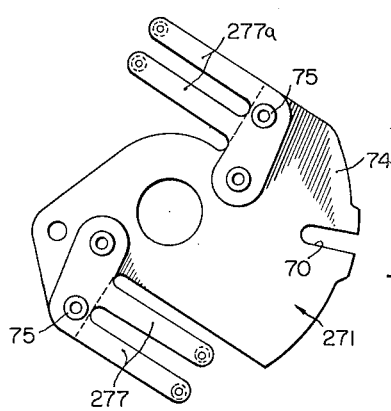
Figure 11:
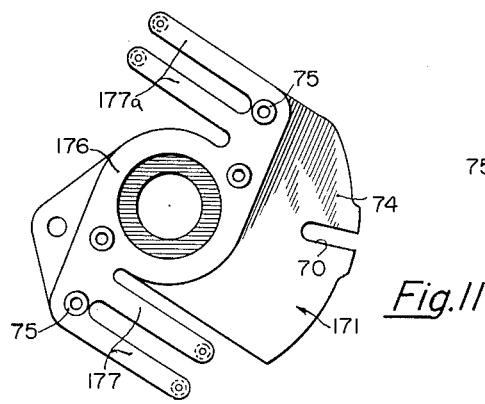

It may also be seen in these same figures that in the present embodiment another double switch structure is provided for round-off operations. This pair includes printed circuit panels 72 and 172 like those shown in Figures 6 and 7, respectively, and wiper structures 71 and 171 like those shown in Figures 9 and 11, respectively. The wiper of Figure 11 includes two pairs of wiper contacts (input 177 and output 177a) conductively connected to each other as indicated at 176. For the combined round-off and clear operation the switch provided may comprise the printed circuit panel 272 as shown in Figure 8 and the wiper 271 shown in Figure 10. It will be noted that the latter wiper comprises two pairs of separated contact elements 277 and 277a rather than being like those shown in Figures 9 and 11, and therefore, its associated panel (Figure 8) includes two input terminals 278.

In the presently illustrated embodiment the output wiper fingers of all the switches normally are in contact with output terminals through the printed wiring elements to serve the purposes of a preset program, but alternatively they could normally be positioned on an insulating portion of the panel. Thus it is seen that by varying the printed circuit panels and their associated wiper contacts, various switching functions may be effected for controlling associated apparatus merely by changing the length of the tappet contact pins 33 carried by the program tray.

Figure 13:
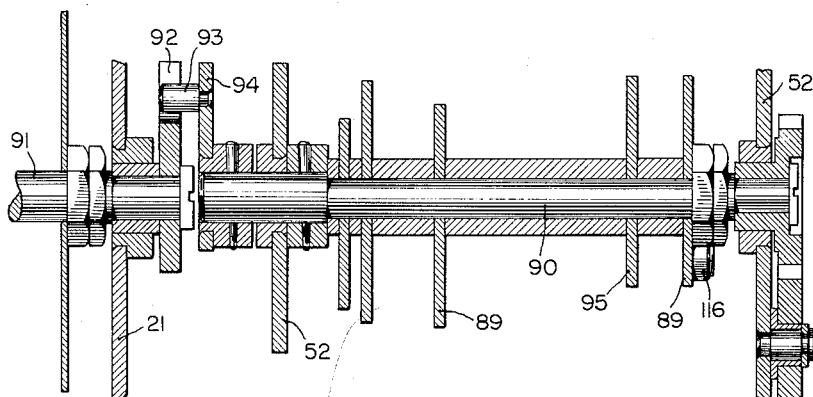
Figure 13 is an enlarged sectional view taken along the line 13—13 of Figure 1.

At the completion of the desired function the above described switch is reset to its initial condition by a cam 89 rotatably mounted by means of the extension 90 of tappet control drive shaft 91 of the basic machine, as seen in Figure 1. To this end, and as seen more clearly in Figure 13, shaft 91 is provided with a crank arm 92 which engages pin 93, fixed to a crank 94 on the adjacent end of shaft extension 90. Cycling of shaft 91 as described in the Butler patent results in a corresponding operation of shaft extension 90.

Figure 15:
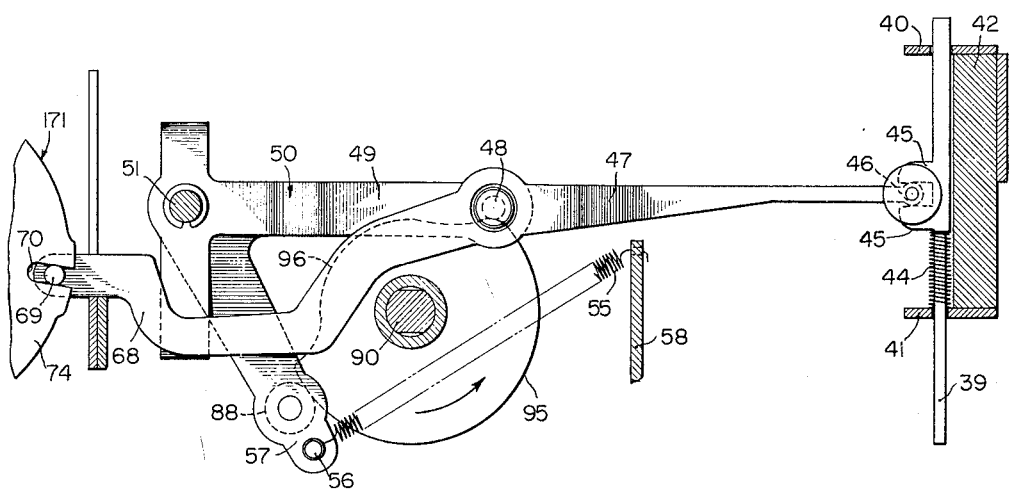
Figure 15 is an enlarged sectional view taken along the line 15—15 of Figure 1.

In the illustrated embodiment it is desirable that certain of the switch structures function with each cycle of the machine. Figure 15 illustrates apparatus incorporating this feature of the invention. It will be seen that a cam 95 is provided to control the counter clockwise rotation of bell crank 50 as urged by coil spring 55. The cam rotates in a counter clockwise direction, as indicated by the arrow thereon, and when the low portion 96 of the cam is presented to cam follower 88, spring 55 rotates the bell crank in a counter clockwise direction to its raised position during which control arm 47 is moved as described above in connection with Figure 14. Resetting of the device to its retracted position is accomplished when the cam has rotated through approximately 180 degrees and the high portion thereof is again presented to follower 88.

It is realized of course that the input and output terminals of the switch structure, as described above, will be connected in circuit with associated apparatus and to a suitable source of power. In order to prevent deleterious sparking as the wiper contact fingers move from one printed circuit conductor to another, means is provided to disconnect the source of power during this movement of the wiper. With reference to Figure 2, it will be seen that the disconnect means includes a switch 100 secured at the right hand side of framing member 52 with its actuating plunger 101 engaged against an inwardly turned end 102 of an elongated link 103 mounted to framing member 52 for limited reciprocatory movement, as by means of studs 104 and 105 passing through slots 106 and 107 (Figure 3) in the link. The link is biased toward the right, as seen in Figures 2 and 3, by a coil spring 108 having one end connected to fixed stud 105 and its other end connected to a pin 109 secured on the inner side of the link, but is held in the position illustrated, that is its left terminal position, by a latch element 110 pivotally mounted on pin 104 and having its forward end 111 engaging an inwardly turned end portion 102 of link 103. The latch is normally urged in its latching position as just described by a coil spring 113 attached at one end to an upwardly extending arm 114 of the latch element and at its other end to fixed structure.

In the present embodiment of the invention and as actually used in the multiplying machine, switch 100 is a single pole double throw switch and is closed in both positions of its actuator 101. However, for the purposes of the present description we may ignore one position of the switch and consider that in the position illustrated in Figure 2 that the switch, so far as the circuits connected to the above-described apparatus are concerned, is in open condition.

In the operation of the apparatus, when solenoid 60 is pulsed, thus to release the bell crank 50, as described above, arm 57 will move toward cam 89, but just prior to contact of cam follower 88 with the cam, pin 115 carried by arm 57, will contact arm 114 of latch element 110 and move it in a clockwise direction, releasing it from latching engagement with the inwardly turned end 102 of link 103, thus permitting the latter to be moved to the right by spring 108. Due to the inertia of the link and the lightness of spring 108 bell crank 50 and hence link 47 completes the positioning of wiper 71 on the selected output printed circuit element as described above prior to the closing of switch 101, which closing in fact takes place at the same moment the wiper comes to rest.

When the high point 89a of cam 89 returns the bell crank to its retracted position where latch 67 is effective to hold control arm 47 in its retracted position, pin 116 on the face of the cam, is urged against arm 117 of a reset bell crank 118 pivotally mounted at 119 and having a forked end arm 120 engaged over a pin 121, thus to rotate the bell crank in a clockwise direction moving link 103 to the left a distance sufficient to permit latch 110 to again move behind end 112 of link 103, to reset switch 100.

Having described an exemplary embodiment of the invention, it is now seen that it provides a novel electromechanical switch apparatus useful in providing function control for automatic machines, and particularly in automatic machines adapted for bookkeeping and accounting purposes.

I claim:

1. Program selecting apparatus for an automatic machine, comprising: movable means on said machine; a plurality of abutments of selected lengths on said movable means; means for sensing the presence of or lack of an abutment at a given position; a multiple position switch; and means for first moving said sensing means into contact with an abutment when aligned therewith and subsequently being operable to move said switch to a position determined by the length of the then aligned abutment; said moving means comprising a link having a first end operatively connected to said sensing means and a second end operatively connected to said switch, and means to move said link in a manner whereby said first end of said link moves said sensing means into contact with an aligned abutment, following which said second end of said link moves said switch; said link moving means comprising a pivotally mounted arm to which said link is pivotally mounted at a point intermediate its ends, means latching said arm in a retracted inoperative position, means for releasing said latch means, and means for moving said arm to extended position for so moving said link.

2. A construction according to claim 1 wherein means is included for resetting said arm to its retracted position.

3. Program selecting apparatus for an automatic machine, comprising: movable means on said machine; a plurality of abutments of selected length on said movable means; a plurality of means for sensing the presence or lack of abutments at given positions; a plurality of multiple position switches; and means for selectively moving said sensing means into contact with said abutments when aligned therewith and subsequently being operable to move said switches to positions determined by the length of the then aligned abutments; said moving means comprising a plurality of links, each having a first end operatively connected to one of said sensing means and a second end operatively connected to one of said switches; and means to move said links in a manner whereby said first end of said links moves said sensing means into contact with aligned abutments, following which said second ends move said links to set said switches; said link moving means comprising pivotally mounted arms to which said links are pivotally mounted at a point intermediate their ends, means latching each arm in a retracted inoperative position, means for releasing said latch means, and means for moving said arms to extended operative positions for so moving said links.

4. Program selecting apparatus for an automatic machine, comprising: movable means on said machine; a plurality of abutments of selected lengths on said movable means, means for sensing the presence or lack of an abutment at a given position; a multiple position switch comprising a fixed insulating panel having printed conductors thereon and a pivotally mounted wiper; means for moving said sensing means into contact with an abutment when aligned therewith, said moving means also being operable subsequently to move said wiper over said conductors to condition said switch in accordance with the length of the then aligned abutment; said wiper moving means comprising a link having one of its ends connected to said sensing means and its other end connected to said wiper, and means for moving said link; said last means comprising a pivotally mounted arm to which said link is pivotally mounted and which is movable between terminal retracted and extended positions, releasable means for latching said arm in its retracted position, means for moving said arm to extended position when said latch means is released, and means for resetting said arm to its retracted position.

5. Program selecting apparatus for an automatic machine, comprising: movable means on said machine; a plurality of abutments of selected lengths on said movable means; means for sensing the presence of or lack of an abutment at a given position; a multiple position switch; and means for first moving said sensing means into contact with an abutment when aligned therewith and subsequently being operable to move said switch to a position determined by the length of the then aligned abutment; said moving means comprising a link having a first end operatively connected to said sensing means and a second end operatively connected to said switch, and means to move said link in a manner whereby said first end of said link moves said sensing means into contact with an aligned abutment, following which said second end of said link moves said switch to the position determined by the length of the aligned abutment.

References Cited in the file of this patent

UNITED STATES PATENTS

| | | |
|---|---|---|
| 1,942,106 | Kottmann | Jan. 2, 1934 |
| 2,084,445 | Kottmann | June 22, 1937 |
| 2,323,824 | Maschmeyer | July 6, 1943 |
| 2,332,755 | Robertson et al. | Oct. 26, 1943 |
| 2,490,348 | Ghertman | Dec. 6, 1949 |
| 2,497,784 | Mehan et al. | Feb. 14, 1950 |
| 2,550,133 | Allan | Apr. 24, 1951 |
| 2,629,549 | Butler | Feb. 24, 1953 |
| 2,652,196 | Sterling | Sept. 15, 1953 |
| 2,728,521 | Benson et al. | Dec. 27, 1955 |
| 2,798,665 | Mosler | July 9, 1957 |
| 2,910,230 | Gang | Oct. 27, 1959 |